(12) United States Patent
Sermersheim et al.

(10) Patent No.: US 8,632,003 B2
(45) Date of Patent: Jan. 21, 2014

(54) MULTIPLE PERSONA INFORMATION CARDS

(75) Inventors: James Sermersheim, Pleasant Grove, UT (US); Andrew A. Hodgkinson, Pleasant Grove, UT (US); Daniel S. Sanders, Orem, UT (US); Thomas E. Doman, Pleasant Grove, UT (US); Duane F. Buss, West Mountain, UT (US)

(73) Assignee: Novell, Inc., Provo, UT (US)

( * ) Notice: Subject to any disclaimer, the term of this patent is extended or adjusted under 35 U.S.C. 154(b) by 899 days.

(21) Appl. No.: 12/360,313

(22) Filed: Jan. 27, 2009

(65) Prior Publication Data

US 2010/0187302 A1 Jul. 29, 2010

(51) Int. Cl.
*G06K 5/00* (2006.01)
*G06F 12/14* (2006.01)

(52) U.S. Cl.
USPC ............................................ 235/380; 726/18

(58) Field of Classification Search
USPC ............. 235/380; 713/182–185, 155; 726/18; 705/39
See application file for complete search history.

(56) References Cited

U.S. PATENT DOCUMENTS

| | | | |
|---|---|---|---|
| 3,614,839 A | 10/1971 | Thomas | |
| 3,949,501 A | 4/1976 | Andrews et al. | |
| 4,153,931 A | 5/1979 | Green et al. | |
| 4,568,403 A | 2/1986 | Egan | |
| 4,730,848 A | 3/1988 | McCormick | |
| 5,073,950 A | 12/1991 | Colbert et al. | |
| 5,485,510 A | 1/1996 | Colbert | |
| 5,546,471 A | 8/1996 | Merjanian | |
| 5,546,523 A | 8/1996 | Gatto | |
| 5,594,806 A | 1/1997 | Colbert | |
| 5,613,012 A | 3/1997 | Hoffman et al. | |
| 5,742,756 A * | 4/1998 | Dillaway et al. | 726/20 |
| 5,848,412 A | 12/1998 | Rowland et al. | |
| 6,016,484 A * | 1/2000 | Williams et al. | 705/39 |
| 6,028,950 A | 2/2000 | Merjanian | |
| 6,055,595 A | 4/2000 | Tachibana et al. | |
| 6,327,578 B1 | 12/2001 | Linehan | |
| 6,363,488 B1 | 3/2002 | Ginter et al. | |
| 6,481,621 B1 | 11/2002 | Herrendoerfer et al. | |
| 6,513,721 B1 | 2/2003 | Salmre et al. | |
| 6,612,488 B2 | 9/2003 | Suzuki | |
| 6,721,713 B1 | 4/2004 | Guheen et al. | |

(Continued)

FOREIGN PATENT DOCUMENTS

EP 0917120 5/1999
JP 11003382 1/1999

(Continued)

OTHER PUBLICATIONS

Gralla, Preston; "How the Internet Works"; Millennium Ed. Que, Aug. 1999.

(Continued)

*Primary Examiner* — Jamara Franklin
(74) *Attorney, Agent, or Firm* — Marger Johnson & McCollom PC

(57) ABSTRACT

A computer-implemented method can include selecting an information card from a group of identified information cards, selecting a persona from a group of identified personae that are associated with the selected information card, and generating a Request for Security Token (RST) based on the selected information card and the selected persona.

20 Claims, 8 Drawing Sheets

(56) References Cited

U.S. PATENT DOCUMENTS

| | | |
|---|---|---|
| 6,880,155 B2 | 4/2005 | Schwabe et al. |
| 6,913,194 B2 | 7/2005 | Suzuki |
| 6,970,836 B1 | 11/2005 | Paltenghe et al. |
| 7,003,501 B2 | 2/2006 | Ostroff |
| 7,065,786 B2 * | 6/2006 | Taguchi .................. 726/18 |
| 7,103,575 B1 | 9/2006 | Linehan |
| 7,104,444 B2 | 9/2006 | Suzuki |
| 7,210,620 B2 | 5/2007 | Jones |
| 7,225,156 B2 | 5/2007 | Fisher et al. |
| 7,231,369 B2 | 6/2007 | Hirabayashi |
| 7,343,351 B1 | 3/2008 | Bishop et al. |
| 7,353,532 B2 | 4/2008 | Duri et al. |
| 7,360,237 B2 | 4/2008 | Engle et al. |
| 7,416,486 B2 | 8/2008 | Walker et al. |
| 7,444,519 B2 | 10/2008 | Laferriere et al. |
| 7,487,920 B2 | 2/2009 | Sato et al. |
| 7,494,416 B2 | 2/2009 | Walker et al. |
| 7,500,607 B2 | 3/2009 | Williams |
| 7,529,698 B2 | 5/2009 | Joao |
| 7,537,152 B2 | 5/2009 | Chakiris et al. |
| RE40,753 E | 6/2009 | Wang et al. |
| 7,555,460 B1 | 6/2009 | Barkan |
| 7,565,329 B2 | 7/2009 | Lapsley et al. |
| 7,591,424 B2 | 9/2009 | Wang et al. |
| 7,594,258 B2 | 9/2009 | Mao et al. |
| 7,610,040 B2 | 10/2009 | Cantini et al. |
| 7,610,390 B2 | 10/2009 | Yared et al. |
| 7,613,659 B1 | 11/2009 | Hoffman et al. |
| 7,620,177 B2 | 11/2009 | Ibrahim et al. |
| 7,636,941 B2 | 12/2009 | Blinn et al. |
| 7,661,585 B2 | 2/2010 | Joao |
| 7,664,022 B2 | 2/2010 | Hu |
| 7,747,540 B2 | 6/2010 | Cameron et al. |
| 7,771,273 B2 | 8/2010 | Walker et al. |
| 7,774,830 B2 | 8/2010 | Dillaway et al. |
| 7,788,493 B2 | 8/2010 | Mononen et al. |
| 7,788,499 B2 | 8/2010 | Cameron et al. |
| 7,797,413 B2 | 9/2010 | Adelman et al. |
| 7,797,434 B2 | 9/2010 | Blakley et al. |
| 7,831,522 B1 | 11/2010 | Satish et al. |
| 7,860,883 B2 | 12/2010 | Hinton et al. |
| 7,870,597 B2 | 1/2011 | Satish et al. |
| 7,996,512 B2 | 8/2011 | Adelman et al. |
| 8,078,880 B2 | 12/2011 | Nanda et al. |
| 8,087,060 B2 | 12/2011 | Norman et al. |
| 8,087,072 B2 | 12/2011 | Gajjala et al. |
| 8,220,035 B1 | 7/2012 | Pravetz et al. |
| 2001/0007983 A1 | 7/2001 | Lee |
| 2002/0026397 A1 | 2/2002 | Ieta et al. |
| 2002/0029337 A1 | 3/2002 | Sudia et al. |
| 2002/0029342 A1 | 3/2002 | Keech |
| 2002/0046041 A1 | 4/2002 | Lang |
| 2002/0083014 A1 | 6/2002 | Brickell et al. |
| 2002/0095360 A1 | 7/2002 | Joao |
| 2002/0103801 A1 | 8/2002 | Lyons |
| 2002/0106065 A1 | 8/2002 | Joyce et al. |
| 2002/0116647 A1 | 8/2002 | Mont et al. |
| 2002/0161688 A1 | 10/2002 | Stewart et al. |
| 2002/0178370 A1 | 11/2002 | Gurevich et al. |
| 2003/0046575 A1 | 3/2003 | Bhogal et al. |
| 2003/0061170 A1 | 3/2003 | Uzo |
| 2003/0126094 A1 | 7/2003 | Fisher et al. |
| 2003/0158960 A1 | 8/2003 | Engberg |
| 2003/0172090 A1 | 9/2003 | Asunmaa et al. |
| 2003/0217140 A1 | 11/2003 | Burbeck et al. |
| 2003/0218062 A1 | 11/2003 | Noriega et al. |
| 2004/0019571 A1 | 1/2004 | Hurwitz et al. |
| 2004/0034440 A1 | 2/2004 | Middlebrook |
| 2004/0128392 A1 | 7/2004 | Blakley et al. |
| 2004/0162786 A1 | 8/2004 | Cross et al. |
| 2004/0199475 A1 | 10/2004 | Rivest et al. |
| 2004/0199787 A1 | 10/2004 | Hans et al. |
| 2004/0230831 A1 | 11/2004 | Spelman et al. |
| 2004/0254816 A1 | 12/2004 | Myers |
| 2005/0027713 A1 | 2/2005 | Cameron et al. |
| 2005/0033692 A1 | 2/2005 | Jarman et al. |
| 2005/0033968 A1 * | 2/2005 | Dupouy et al. ................ 713/183 |
| 2005/0044423 A1 | 2/2005 | Mellmer et al. |
| 2005/0091543 A1 | 4/2005 | Holtzman et al. |
| 2005/0097550 A1 | 5/2005 | Schwabe et al. |
| 2005/0124320 A1 | 6/2005 | Ernst et al. |
| 2005/0135240 A1 | 6/2005 | Ozugur |
| 2005/0137737 A1 | 6/2005 | Sato et al. |
| 2005/0171898 A1 * | 8/2005 | Bishop et al. ................ 705/39 |
| 2005/0229005 A1 | 10/2005 | Le Saint et al. |
| 2005/0247777 A1 | 11/2005 | Pitroda |
| 2005/0247797 A1 | 11/2005 | Ramachandran |
| 2005/0289080 A1 | 12/2005 | Rhiando |
| 2005/0289341 A1 | 12/2005 | Ritola et al. |
| 2006/0020679 A1 | 1/2006 | Hinton et al. |
| 2006/0136990 A1 | 6/2006 | Hinton et al. |
| 2006/0155993 A1 | 7/2006 | Busboon |
| 2006/0200424 A1 | 9/2006 | Cameron et al. |
| 2006/0206931 A1 | 9/2006 | Dillaway et al. |
| 2006/0224611 A1 | 10/2006 | Dunn et al. |
| 2006/0235796 A1 | 10/2006 | Johnson et al. |
| 2007/0016484 A1 | 1/2007 | Waters et al. |
| 2007/0016943 A1 | 1/2007 | M'Raihi et al. |
| 2007/0043651 A1 | 2/2007 | Xiao et al. |
| 2007/0061567 A1 | 3/2007 | Day et al. |
| 2007/0118449 A1 | 5/2007 | De La Motte |
| 2007/0143835 A1 | 6/2007 | Cameron et al. |
| 2007/0162581 A1 | 7/2007 | Maes |
| 2007/0192245 A1 | 8/2007 | Fisher et al. |
| 2007/0199056 A1 | 8/2007 | Bhatia et al. |
| 2007/0203852 A1 | 8/2007 | Cameron et al. |
| 2007/0204168 A1 | 8/2007 | Cameron et al. |
| 2007/0204325 A1 | 8/2007 | Cameron et al. |
| 2007/0208869 A1 | 9/2007 | Adelman et al. |
| 2007/0208940 A1 | 9/2007 | Adelman et al. |
| 2007/0214079 A1 | 9/2007 | Mears |
| 2007/0214429 A1 | 9/2007 | Lyudovyk et al. |
| 2007/0266082 A1 | 11/2007 | McConnell et al. |
| 2007/0282951 A1 | 12/2007 | Selimis et al. |
| 2007/0294431 A1 | 12/2007 | Adelman et al. |
| 2007/0294753 A1 | 12/2007 | Tanaka et al. |
| 2008/0003977 A1 | 1/2008 | Chakiris et al. |
| 2008/0010675 A1 | 1/2008 | Massascusa et al. |
| 2008/0022379 A1 | 1/2008 | Wray |
| 2008/0028215 A1 | 1/2008 | Nanda et al. |
| 2008/0071808 A1 | 3/2008 | Hardt et al. |
| 2008/0098228 A1 | 4/2008 | Anderson et al. |
| 2008/0140576 A1 | 6/2008 | Lewis et al. |
| 2008/0141339 A1 | 6/2008 | Gomez et al. |
| 2008/0141366 A1 | 6/2008 | Cross et al. |
| 2008/0162297 A1 | 7/2008 | Hershkovitz et al. |
| 2008/0178271 A1 | 7/2008 | Gajjala et al. |
| 2008/0178272 A1 | 7/2008 | Gajjala et al. |
| 2008/0184339 A1 | 7/2008 | Shewchuk et al. |
| 2008/0189778 A1 | 8/2008 | Rowley |
| 2008/0196096 A1 | 8/2008 | Grynberg |
| 2008/0222714 A1 | 9/2008 | Wahl |
| 2008/0229410 A1 | 9/2008 | Felsted et al. |
| 2008/0235144 A1 | 9/2008 | Phillips |
| 2008/0244722 A1 | 10/2008 | Satish et al. |
| 2008/0256594 A1 | 10/2008 | Satish et al. |
| 2008/0263644 A1 | 10/2008 | Grinstein |
| 2008/0288404 A1 | 11/2008 | Pirzadeh et al. |
| 2008/0289020 A1 | 11/2008 | Cameron et al. |
| 2008/0301784 A1 | 12/2008 | Zhu et al. |
| 2008/0313567 A1 | 12/2008 | Sabin et al. |
| 2009/0013391 A1 | 1/2009 | Ernst |
| 2009/0037920 A1 | 2/2009 | Brown et al. |
| 2009/0077118 A1 | 3/2009 | Doman et al. |
| 2009/0077627 A1 | 3/2009 | Doman et al. |
| 2009/0077638 A1 | 3/2009 | Norman et al. |
| 2009/0089625 A1 | 4/2009 | Kannappan et al. |
| 2009/0089870 A1 | 4/2009 | Wahl |
| 2009/0089871 A1 | 4/2009 | Murphy et al. |
| 2009/0099860 A1 | 4/2009 | Karabulut et al. |
| 2009/0119756 A1 | 5/2009 | Acuna et al. |
| 2009/0125558 A1 | 5/2009 | Suh |
| 2009/0131157 A1 | 5/2009 | Hedrick et al. |
| 2009/0138398 A1 | 5/2009 | Cole et al. |

(56) References Cited

U.S. PATENT DOCUMENTS

| | | | |
|---|---|---|---|
| 2009/0178112 A1 | 7/2009 | Doman et al. | |
| 2009/0186701 A1 | 7/2009 | Rowe et al. | |
| 2009/0193518 A1* | 7/2009 | Craine | 726/18 |
| 2009/0199284 A1 | 8/2009 | Sanders et al. | |
| 2009/0204622 A1 | 8/2009 | Sanders et al. | |
| 2009/0205014 A1 | 8/2009 | Doman et al. | |
| 2009/0205035 A1 | 8/2009 | Semersheim et al. | |
| 2009/0216666 A1 | 8/2009 | Antao et al. | |
| 2009/0241178 A1 | 9/2009 | Burch et al. | |
| 2009/0249430 A1 | 10/2009 | Buss et al. | |
| 2009/0251749 A1 | 10/2009 | O'Boyle et al. | |
| 2009/0254476 A1 | 10/2009 | Sharma et al. | |
| 2009/0254483 A1 | 10/2009 | Barkan | |
| 2009/0254745 A1 | 10/2009 | Ganesan | |
| 2009/0260064 A1 | 10/2009 | McDowell et al. | |
| 2009/0300512 A1 | 12/2009 | Ahn | |
| 2009/0300714 A1 | 12/2009 | Ahn | |
| 2009/0300747 A1 | 12/2009 | Ahn | |
| 2009/0319795 A1 | 12/2009 | Sharif et al. | |
| 2009/0320095 A1 | 12/2009 | Nanda et al. | |
| 2009/0328166 A1 | 12/2009 | Burch et al. | |
| 2009/0328198 A1* | 12/2009 | Rothman | 726/18 |
| 2010/0037303 A1 | 2/2010 | Sharif et al. | |
| 2010/0064134 A1 | 3/2010 | Gross et al. | |
| 2010/0274691 A1 | 10/2010 | Hammad et al. | |
| 2011/0023103 A1 | 1/2011 | Dietrich et al. | |
| 2011/0041140 A1 | 2/2011 | Harm et al. | |
| 2011/0213959 A1 | 9/2011 | Bodi et al. | |
| 2011/0265155 A1 | 10/2011 | Liu | |

FOREIGN PATENT DOCUMENTS

| | | |
|---|---|---|
| JP | 11039540 | 2/1999 |
| JP | 11154260 | 6/1999 |
| WO | WO98/23062 | 5/1998 |
| WO | WO2008/088945 | 7/2008 |

OTHER PUBLICATIONS

Microsoft Corporation, "Microsofts Vision for an Identity Metasystem" http://msdn.microsoft.com/en-us/library/ms996422.aspx, May 2005, pp. 1-7.

Nagarkar, V., "How to Drag Drop in javascript (Part I)", Internet Article, http://www.codeproject.com/KB/scripting/DragDrip_Part_1_.aspx, Jun. 11, 2006 (12 pages).

Alrodhan, et al., "Addressing privacy issues in CardSpace", 2007, IEEE, pp. 285-291.

Computer Security Institute; "What InfoCard Is and Isn't"; http://web.archive.org/web/20060423133 805/http:/www.identityblog.com/wp-content/resources/alert.pdf, May 2006 (4 pages).

Cameron, Kim et al; "Design Rationale behind the Identity Metasystem Architecture"; http://www.identityblog.com/, http://research.microsoft.com/~mbj/; Mar. 16, 2006, pp. 1-11.

Chappell, David; "Introducing Windows CardSpace"; Windows Vista Technical Articles, http://msdn2.microsoft.com/en-us/library/aa480189(d=printer).aspx, Apr. 2006, pp. 1-15.

The Higgins Foundation; "Higgins FAQ"; http://www.eclipse.org/higgins/faq.php; printed Aug. 13, 2007; pp. 1-2.

Hoang et al.; "Secure Roaming with Identity Metasystems"; ACM 978-1-60558-006-1; http://portal.acm.org/citation.cfm?id=1373297; 2008, pp. 36-47.

"Components—Eclipsepedia"; http://wiki.eclipse.org/Components; printed Aug. 13, 2007; pp. 1-8.

"Architecture—Eclipsepedia"; http://wiki.eclipse.org/index.php/Architecture; printed Aug. 13, 2007; pp. 1-2.

U.S. Appl. No. 11/395,725, filed Mar. 31, 2006, entitled "Methods and Systems for Multi-Factor Authentication"; This is a commonly owned application that is in the same general field as the invention.

"The Resource STS: R-STS, RP-STS, A-STS . . . the other face of token issuing"; Vibro.NET; http://209.85.175.104/search?q=cache:mFlf-sZFBLsJ:blogs.msdn.comlvbertocci/arch ive/2007/09/24/the-resource-sts-r-stsrp-sts-a-sts-the- other-face-of-token-issuing.aspx+microsoft+age+STS+RP&hl=en&ct=clnk&cd=2 &gl=us&client=fire fox-a; MSDN Blogs; 2007, pp. 1-7.

"Identity Selector Interoperability Profile specification and companion guides"; Microsoft Download Center; http://www.microsoft.com/downloads/details.aspx?DisplayLang=en &FamilyID=b94817fc-3991-4ddO-8e85-b73e626f6764; Microsoft Corporation; 2007.

Nanda, Arun; Identity Selector Interoperability Profile V1.0; Microsoft Download Center, http://download.microsoft. com/down load/1/1/a/11 ac6505-e4cO-4e05-987c-6f1 d31855cd2/Identity-Selector-Interop-Profile-v1 .pdf; Microsoft Corporation; Apr. 2007, pp. 1-52.

Microsoft Corporation, Ping Identity Corporation, "An Implementer's Guide to the Identity Selector Interoperability Profile V1.0"; Microsoft Download Center, http://download.microsoft.com/download/1/1/a/11ac6505-e4cO-4e05-987c-6f1 d31855cd2/Identity-Selector-Interop-Profile-v1-Guide.pdf; Microsoft Corporation; Apr. 2007, pp. 1-74.

Jones, Michael B.; "A Guide to Using the Indentity Selector interoperability Profile V1.0 within Web Applications and Browsers"; Microsoft Download Center; http://download.microsoft.com/download/1/1/a/11ac6505-e4cO-4e05-987c-6f1 d31855cd2/Identity-Selector-Interop-Profile-v1-Web-Guide.pdf; Microsoft Corporation; Apr. 2007, pp. 1-14.

Jones, Michael B., "Michael B. Jones Homepage"; http://research.microsoft.com/en-us/um-people/mbj; Aug. 12, 2009, pp. 1-4.

Jones, Michael B., "Mike Jones: self-issued"; http://research.microsoft.com/en-us/um-people/mbj; Aug. 12, 2009, pp. 1-45.

Just, Mike; "Designing Authentication Systems with Challenge Questions"; Security and Usability, Lorrie Faith Cranor and Simson Garfinkel (eds.); O'Reilly Media, Inc., Sebastopol, CA; Aug. 5, 2005; Chapter 8, pp. 147-160.

"PwdHash From Stanford—Generate Passwords by Hashing the URL"; Don't Learn to Hack -Hack to Learn, http://www.darknet.org.uk/2007/03/pwdhash-from-stanford-generate; Darknet; Mar. 13, 2007, pp. 1-8.

"Microsoft's Vision for an Identity Metasystem"; http://www.identityblog.com/stories/2005/07/05/IdentityMetasystem.htm; Microsoft Corporation; May 2005, pp. 1-10.

Gnucitizen, "Attacking Password Recovery Facilities"; http://www/gnucitizen.org/blog/attacking-password-recovery-facilities; Jul. 6, 2007, pp. 1-4.

Sol, S., "The Display (GUI) Layer" Intro to the Web Application Development Environment, http://web.archive.org/web/20001119171800/http://extropia.com/tutorials/devenv/gui.html>, Nov. 19, 2000, pp. 1-10, XP002517142.

Cambridge, "Cambridge Dictionary Online", Internet Article, http://dictionary.cambridge.org/define.asp?key=11419&dict=CALD>, Feb. 26, 2009, XP002517143.

Harjanto, A., "InfoCard and Browser Integration", Internet Article, http://blogs.msdn.com/andyhar/archive/2006/02/20/535333.aspx>, Feb. 20, 2006, XP002517147.

Dingle, P., "Identity Selectors & Browser Detection", Internet Article, http://eternallyoptimistic.com/2006/11/05/identity-selectors-browser-detection/>, Nov. 5, 2006, XP002517148.

Techtree News Staff, "Infocard Spells End of Passwords", Internet Article, http://www.techtree.com/techtree/jsp/article.jsp?print=1 &article_id=71396&cat_id=582>, Feb. 16, 2006, XP002517144.

Tewfiq El Maliki et al.; A Survey of User-centric Identity Management Technologies; Emerging Security Information Systems, and Technologies, 2007, pp. 12-17.

Sanders, T., "IBM/Novell unveil rival to Microsoft Infocard", Internet Article, http://www.vnunet.com/articles/print/2151060>, Feb. 26, 2006, XP002517145.

Cameron, K., "Bill Gates, Inforcards and the Identity Metasystem", Internet Article, http://www.identityblog.com/?p=374>, Feb. 19, 2006, XP002517146.

Darknet (2007), "Don't Learn to Hack—Hack to Learn". Retrieved from http://www.darknet.org.uk/2007/03/pwdhash-from-stanford-generate-passwords-by-hashing-the-url, pp. 1-7.

(56) References Cited

OTHER PUBLICATIONS

Allan, A. (2003), "Best Practices for Managing Passwords: Self-Service Q&A". Published by Garner, Inc. at Tutorials, TU-20-2040, pp. 1-5.

Microsoft Corporation, Ping Identity Corporation (Aug. 2005), "A Guide to Integrating with InfoCard v1.0", XP007908505, pp. 1-62.

Gevers et al., Enhancing Privacy in Identity Management Systems, WPES '07, ACM, Oct. 2007 (4 pages).

Jones, Michael B.; A Guide to Supporting Information Cards within Web Applications and Browers as of the Information Card Profile V1.0; Microsoft Download Center; http://msdn.microsoft.com/en-us/library/aa480726.aspx; Dec. 2006, pp. 1-13.

Maler, E; Reed D. "The Venn of Indentity: Options and Issues in Federated Identity Management", Security & Privacy, IEEE vol. 6, Issue: 2, Mar.-Apr. 2008, pp. 16-23.

Min Wu, Robert C. Miller, Greg Little, "Web wallet: preventing phishing attacks by revealing user intentions", Jul. 2006 SOUPS '06: Proceedings on the second symposium on Usable privacy and security, pp. 102-113.

White, "How Computers Work, Millennium Edition", 1999, Que Corporation.

OAuthCore 1.0, Pub. Date: Dec. 4, 2007, oauth.net/core/1.0/, pp. 1-14.

Jain et al., "Identity enabling Web Services", Sep. 10, 2008, http://docs.google.com/Present?docid=dg3mfs7f__1gxwtcscx&skipauth=true, p. 1-36.

* cited by examiner

MULTIPLE PERSONA INFORMATION CARDS

CROSS-REFERENCE TO RELATED APPLICATIONS

This application is related to co-pending and commonly owned U.S. patent application Ser. No. 11/843,572, titled "PERFORMING A BUSINESS TRANSACTION WITHOUT DISCLOSING SENSITIVE IDENTITY INFORMATION TO A RELYING PARTY," U.S. patent application Ser. No. 11/843,638, titled "POLICY-BASED AUDITING OF IDENTITY CREDENTIAL DISCLOSURE BY A SECURE TOKEN SERVICE," U.S. patent application Ser. No. 11/843,640, titled "FRAMEWORK AND TECHNOLOGY TO ENABLE THE PORTABILITY OF INFORMATION CARDS," U.S. patent application Ser. No. 11/843,608, titled "CHAINING INFORMATION CARD SELECTORS," and U.S. patent application Ser. No. 11/843,591, titled "CREDENTIAL CATEGORIZATION," all of which were filed on Aug. 27, 2007, and all of which claim the benefit of U.S. Provisional Patent Application Ser. Nos. 60/895,312, 60/895,316, and 60/895,325, which were filed on Mar. 16, 2007. All of the foregoing applications are fully incorporated by reference herein.

This application is also related to co-pending and commonly owned U.S. patent application Ser. No. 12/019,104, titled "PROCESSING HTML EXTENSIONS TO ENABLE SUPPORT OF INFORMATION CARDS BY A RELYING PARTY," filed on Jan. 24, 2008, which claims the benefit of U.S. Provisional Patent Application Ser. No. 60/973,679, filed on Sep. 19, 2007; and is related to co-pending and commonly owned U.S. patent application Ser. No. 12/030,063, titled "INFO CARD SELECTOR RECEPTION OF IDENTITY PROVIDER BASED DATA PERTAINING TO INFO CARDS," filed on Feb. 12, 2008; and is related to co-pending and commonly owned U.S. patent application Ser. No. 12/029,373, titled "VISUAL AND NON-VISUAL CUES FOR CONVEYING STATE OF INFORMATION CARDS, ELECTRONIC WALLETS, AND KEYRINGS," filed on Feb. 11, 2008; and is related to co-pending and commonly owned U.S. patent application Ser. No. 12/054,774, titled "CLAIM CATEGORY HANDLING," filed on Mar. 25, 2008; and is related to co-pending and commonly owned U.S. patent application Ser. No. 12/042,205, titled "PRIVATELY SHARING RELYING PARTY REPUTATION WITH INFORMATION CARD SELECTORS," filed on Mar. 4, 2008; and is related to co-pending and commonly owned U.S. patent application Ser. No. 12/026,775, titled "METHODS FOR SETTING AND CHANGING THE USER CREDENTIAL IN INFORMATION CARDS," filed on Feb. 6, 2008. All of the foregoing applications are fully incorporated by reference herein.

This application is also related to co-pending and commonly owned U.S. patent application Ser. No. 12/038,674, titled "SYSTEM AND METHOD FOR SECURE ACCOUNT RESET UTILIZING INFORMATION CARDS," filed on Feb. 27, 2008; and is related to co-pending and commonly owned U.S. patent application Ser. No. 12/044,816, titled "SYSTEM AND METHOD FOR USING WORKFLOWS WITH INFORMATION CARDS," filed on Mar. 7, 2008; and is related to co-pending and commonly owned U.S. patent application Ser. No. 12/108,805, titled "RESTRICTED USE INFORMATION CARDS," filed on Apr. 24, 2008; and is related to co-pending and commonly owned U.S. patent application Ser. No. 12/112,772, titled "DYNAMIC INFORMATION CARD RENDERING," filed on Apr. 30, 2008; and is related to co-pending and commonly owned U.S. patent application Ser. No. 12/054,137, titled "CARDSPACE HISTORY VALIDATOR," filed on Mar. 24, 2008; and is related to co-pending and commonly owned U.S. patent application Ser. No. 12/111,874, titled "REMOTABLE INFORMATION CARDS," filed on Apr. 29, 2008. All of the foregoing applications are fully incorporated by reference herein.

This application is also related to co-pending and commonly owned U.S. patent application Ser. No. 12/170,384, titled "NON-INTERACTIVE INFORMATION CARD TOKEN GENERATION," filed on Jul. 9, 2008; and is related to co-pending and commonly owned U.S. patent application Ser. No. 12/184,155, titled "SITE-SPECIFIC CREDENTIAL GENERATION USING INFORMATION CARDS," filed on Jul. 31, 2008; and is related to co-pending and commonly owned U.S. patent application Ser. No. 12/201,754, titled "SYSTEM AND METHOD FOR VIRTUAL INFORMATION CARDS," filed on Aug. 29, 2008; and is related to co-pending and commonly owned U.S. patent application Ser. No. 12/352,465, titled "INFORMATION CARD OVERLAY," filed on Jan. 12, 2009. All of the foregoing applications are fully incorporated by reference herein.

TECHNICAL FIELD

The disclosed technology pertains to information cards, and more particularly to the use of multiple personae and/or roles in connection with information cards.

BACKGROUND

When a user interacts with certain sites on the Internet such as service providers, which are also referred to as relying parties, the service provider often expects to know something about the user that is requesting the services of the provider. The typical approach for a service provider is to require the user to log into or authenticate to the service provider's computer system. But this approach, while satisfactory for the service provider, is less than ideal for the user.

For example, the user must remember a username and password for each service provider that expects such information. Given that different computer systems impose different requirements, along with the possibility that another user might have already chosen the same username, the user might not be able to use the same username/password combination for each such computer system. There is also the related problem that, if the user uses the same username/password combination on multiple computer systems, someone who hacks one such computer system would likely be able to access other such computer systems.

It is estimated that an average user has over 100 accounts on the Internet. For users, this is becoming an increasingly frustrating problem to deal with. Passwords and account names are too hard to remember. Second, the user typically has no control over how the service provider uses the information it stores. If the service provider uses the stored information in a way the user does not want, for example, the user has relatively little ability to prevent such abuse—and essentially no recourse after the fact.

In the past few years, the networking industry has developed the concept of information cards to tackle these problems. Information cards are a very familiar metaphor for users and the idea is gaining rapid momentum. Information cards allow users to manage their identity information and control how it is released. This gives users greater convenience in organizing their multiple personae, their preferences, and their relationships with vendors and identity providers. Interactions with on-line vendors are greatly simplified.

There are currently two kinds of information cards: personal cards (or self-issued cards) and managed cards (or cards that are issued by an identity provider (IdP) or security token service (STS)). A personal card contains self-asserted identity information. In other words, the person issues the card and is the authority for the identity information it contains. In contrast, the managed card is issued by an identity provider, which provides the identity information and asserts its validity.

When a relying party requests identity information from the user, a tool known as an identity selector or card selector can assist the user in selecting an appropriate information card. For example, the card selector can present to the user one or more information cards that satisfy a given security policy and claim requirements of the relying party. When a managed card is selected, the card selector can communicate with the identity provider to obtain a security token that contains the needed information.

While information card technologies are becoming more widespread in applications, there remain certain problems for which no adequate solutions exist. For example, in today's systems, each information card represents a single digital identity (e.g., persona and/or role(s)). When a card is selected (e.g., via a card selector), it is used to produce the claims needed for the relying party—but only for the single digital identity. Thus, in situations where a user wishes to maintain multiple personae and/or roles, no matter how similar they may be to each other, he or she is burdened with an undesirable need to obtain and manage (e.g., keep track of) multiple information cards (e.g., one for each digital identity).

There remains a need for a way to address these and other problems associated with the prior art.

SUMMARY

Embodiments of the disclosed technology can advantageously provide a user with the ability to use a single information card in connection with multiple personae and/or roles. For example, the information card can define a Persona element to indicate which persona is to be associated with the information card. The user is thus desirably relieved of any burden to obtain and manage multiple information cards in order to maintain multiple personae and/or roles.

Embodiments of the disclosed technology can include a card selector that allows for a single information card to be used in connection with multiple personae and/or roles. For example, a card selector can automatically present a user with the personae and/or roles available to be selected for a given information card. Thus, the user can first select a particular card and then select a particular persona and/or one or more roles to be used in connection with the selected information card. Alternatively, the user can first select a persona and/or one or more roles and then select (e.g., using a card selector) an associated persona.

The foregoing and other features, objects, and advantages of the invention will become more readily apparent from the following detailed description, which proceeds with reference to the accompanying drawings.

DETAILED DESCRIPTION

Figure 1:
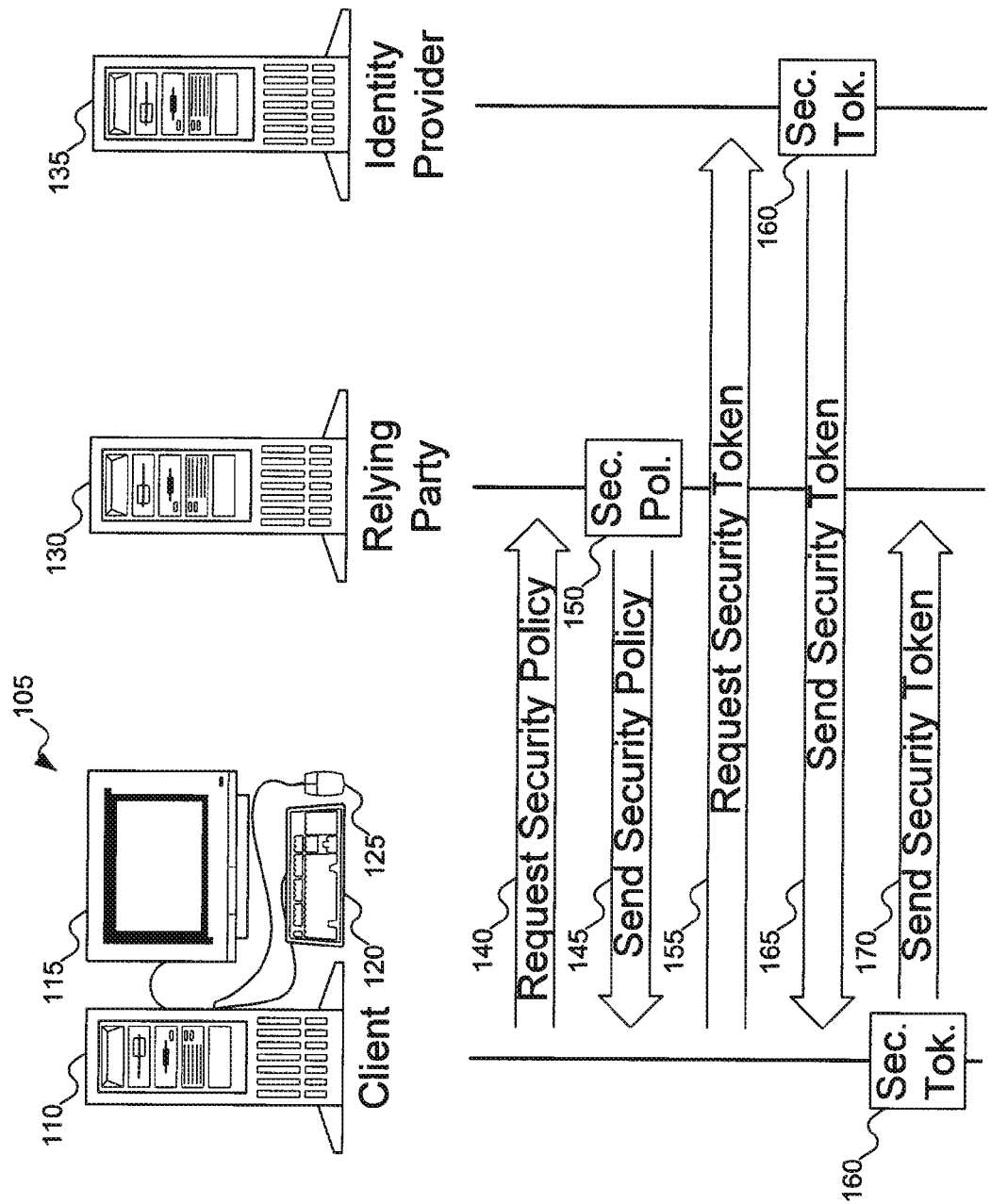
FIG. 1 illustrates an example of a sequence of communications between a client, a relying party, and an identity provider.

Before describing various embodiments of the disclosed technology, it is important to understand the context of the disclosed technology. FIG. 1 shows an example of a sequence of communications between a client, a relying party, and an identity provider. For simplicity, each of the parties (i.e., the client, the relying party, and the identity provider) may be referred to by their respective machines. Actions attributed to each party are taken by that particular party's machine, except where the context indicates that the actions are taken by the actual party itself.

In FIG. 1, a client computer system 105 includes a computer 110, a monitor 115, a keyboard 120, and a mouse 125. One having ordinary skill in the art will recognize that various other components can be included with the client computer system 105, such as other input/output devices (e.g., a printer), for example. In addition, FIG. 1 does not show some of the conventional internal components of the client computer system 105, such as a central processing unit, memory, storage, etc.

Although FIG. 1 shows the client computer system 105 as a conventional desktop computer, one having ordinary skill in the art will recognize that the client computer system 105 can be any type of machine or computing device capable of providing the services attributed herein to the client computer system 105, including, but not limited to, a laptop computer, a personal digital assistant (PDA), or a cellular telephone, for example. One having ordinary skill in the art will also recognize that the client computer system 105 can interact with other computer systems, such as a relying party 130 and an identity provider 135, for example, either directly or over a network of virtually any type.

The relying party 130 is typically a machine managed by a party that relies in some way on the identity of the user of the client computer system 105. The operator of the relying party 130 can generally be any type of relying party. For example, the operator of the relying party 130 can be a merchant running a business on a website. Alternatively, the operator of the relying party 130 can be an entity that offers assistance on some matter to registered parties. The relying party 130 is so named because it relies on establishing some identifying information about the user. For purposes of the present application, the relying party 130 can refer to an application residing on and/or running on the client computer system 105 itself.

The identity provider 135 is typically managed by a party that is responsible for providing identity information (or other such information) about the user for consumption by the relying party 130. Depending on the type of information that the identity provider 135 stores for a user, a single user might store identifying information with any number of different identity providers 135, any of which might be able to satisfy the request of the relying party 130. For example, the identity provider 135 might be a governmental agency responsible for storing information generated by the government, such as a driver's license number or a social security number. Alternatively, the identity provider 135 might be a third party that is in the business of managing identity information on behalf of a wide variety of users.

Conventional methodology of releasing identity information can be found in a number of sources, such as a document published by Microsoft entitled "Introducing Windows Card-Space," which can be found on the World Wide Web at http://msdn2.microsoft.com/en-us/library/aa480189.aspx and is hereby incorporated by reference. To summarize the operation of Windows CardSpace, when a user wants to access some data from the relying party 130, the client computer system 105 requests the security policy of the relying party 130, as shown in a communication 140, which is returned in a communication 145 as a security policy 150. The security policy 150 is typically a summary of the information the relying party 130 needs, how the information should be formatted, and so on.

Once the client computer system 105 has the security policy 150, the client computer system 105 can identify which information cards will satisfy the security policy 150. Different security policies might result in different information cards being usable. For example, if the relying party 130 simply needs a username and password combination, the information cards that will satisfy this security policy will typically be different from the information cards that satisfy a security policy requesting the user's full name, mailing address, and social security number. The user can then select an information card that satisfies the security policy 150.

An identity selector (also referred to as a card selector) on the client computer system 105 can be used by the user to select the appropriate information card. The card selector may present the user with a list or graphical display of all available information cards. Information cards that satisfy the security policy may be highlighted in some way to distinguish them from the remaining cards. Alternatively, the card selector may display only the information cards that will satisfy the security policy. The card selector may provide a means for the user to select the desired information card by, for instance, a mouse click or a touch on a touch screen.

Once the user has selected an acceptable information card, the client computer system 105 can use the selected information card to transmit a Request for Security Token (RST) from the identity provider 135, as shown in a communication 155. This request can identify the data to be included in the security token, the credential that identifies the user, and other data the identity provider needs to generate the security token. The identity provider 135 can return a security token 160, as shown in a communication 165.

The security token 160 can include a number of claims (e.g., pieces of information) that typically include data that the user wants to release to the relying party. The security token 160 is usually encrypted in some manner, and perhaps signed and/or time-stamped by the identity provider 135 so that the relying party 130 can be certain that the security token originated with the identity provider 135, as opposed to being spoofed by someone intent on defrauding the relying party 130. The client computer system 105 can then forward the security token 160 to the relying party 130, as shown in a communication 170.

Alternatively, the selected information card can be a self-issued information card (also called a personal card). A self-issued information card typically refers to an information card that is issued not by an identity provider but by the client computer system 105 itself. In that case, the identity provider 135 effectively becomes part of the client computer system 105.

In this model, a person skilled in the art will recognize that because all information flows through the client computer system 105, the user has a measure of control over the release of the user's identity information. The relying party 130 only receives the information the user wants the relying party 130 to have, and generally does not store that information on behalf of the user.

Exemplary Client Computer System for Using Information Cards

Figure 2:
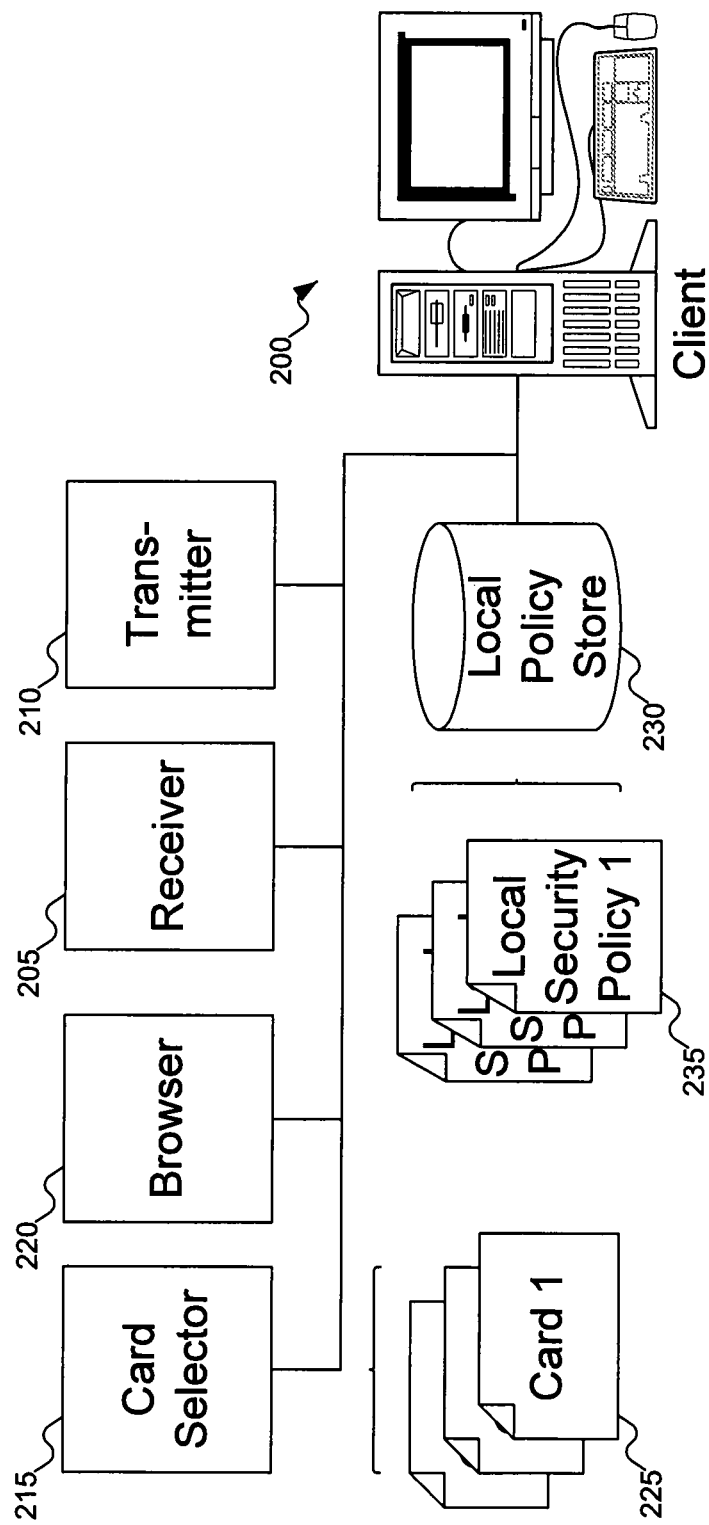
FIG. 2 illustrates an example of a client computer system that includes a receiver, a transmitter, a card selector, and a browser.

FIG. 2 illustrates an example of a client computer system 200 (such as the client computer system 105 of FIG. 1, for example) that includes a receiver 205, a transmitter 210, a card selector 215, and a browser 220. The receiver 205 is generally responsible for receiving data transmitted to the client computer system 200, while the transmitter 210 is usually responsible for transmitting information from the client computer system 200. The receiver 205 and the transmitter 210 may facilitate communications between the client computer system 200, a relying party (such as the relying party 130 of FIG. 1), and an identity provider (such as the identity provider 135 of FIG. 1), for example.

The card selector 215 is typically responsible for enabling a user to select an information card that satisfies a particular security policy. The card selector 215 can present the user with a single information card to select or virtually any number of information cards (e.g., information card 225) from which the user can select a particular one. The card selector 215 is also typically responsible for enabling a user to obtain managed cards from identity providers and to install the managed cards on the client computer system 200.

The browser 220 can allow the user to interact with web pages on a network, such as web pages created by an identity provider. The user may use the browser 220 to obtain a managed card by, for example, visiting a web page created by the identity provider and filling out a web-based form.

The client computer system 200 also includes a local policy store 230, which can store local security policies such as local security policy 235. In the example, the local security policy 235 is a local security policy defining how information cards can be defined and used.

Exemplary Information Cards

An information card typically contains metadata representing the relationship between an identity provider and the digital identity associated with the information card. For example, a typical information card can specify a card name element, a language identifier, an information card reference identifier, an element for identifying the issuer of the card, an element for indicating the card's date of issuance and expiration date, an element for indicating the identity provider's supported token services as a list, an element for indicating the identity provider's supported token types as a list, an element identifying a relying party for which a security token is being requested, and an element specifying supported claim types.

Figure 3:
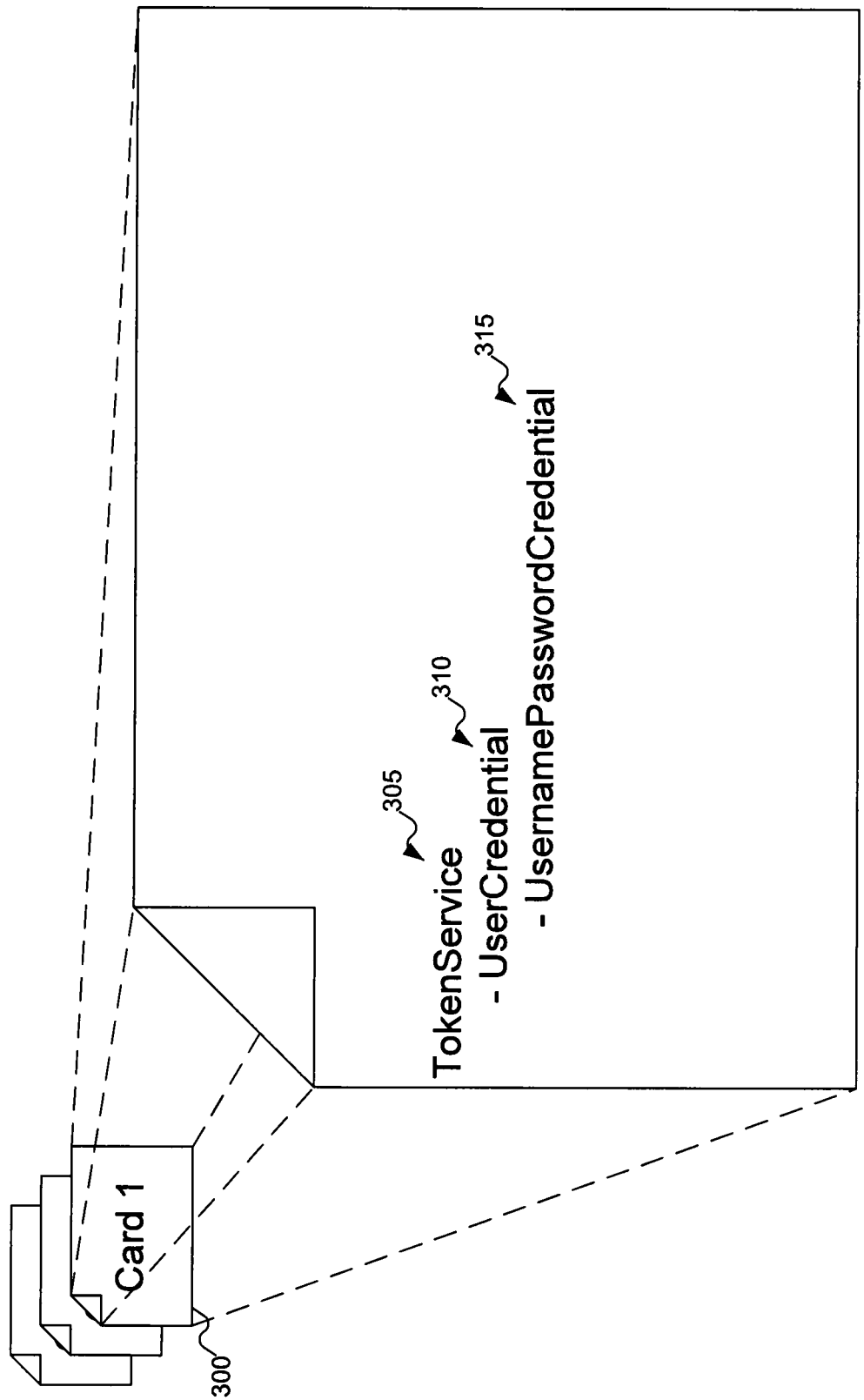
FIG. 3 illustrates an example of an information card.

FIG. 3 illustrates an example of an information card 300 (such as the information card 225 of FIG. 2, for example). The information card 300 has a TokenService element 305 that provides an ordered list of security token service (STS) endpoints. The TokenService element 305 has a child element UserCredential 310 that indicates which credential type (e.g., username/password, Kerberos, X.509 certificate, or self-issued) should be used to authenticate to a particular STS endpoint. In the example, the UserCredential element 310 includes a username/password credential UsernamePasswordCredential 315. The UserCredential element 310 can also include optional elements such as DisplayCredentialHint (not shown).

If the information card 300 is a managed information card (e.g., managed by an identity provider such as identity provider 135 of FIG. 1, for example), then the information represented by the information card 300 is not actually stored on the client computer system; rather, the information is stored by the identity provider. Thus, the information displayed on the information card 300 would not be the actual information stored by the client computer system but an indicator of what information is included in the information card 300.

Exemplary Personae and Roles in Accordance with Implementations of the Disclosed Technology There are many situations in which a user may wish to maintain multiple personae and/or roles. For example, consider an example in which a user named Jim wishes to maintain two different personae: a first persona (e.g., "JimAtWork") for use with work-related roles and a second persona (e.g., "JimAtHome") for use with personal (e.g., non-work-related) roles. In prior art systems, Jim is undesirably burdened with a requirement to obtain and maintain at least one separate information card for each persona or role.

In contrast, implementations of the disclosed technology as described herein can advantageously provide users such as Jim with the ability to maintain multiple personae and/or roles without needing more than a single information card. As used herein, the terms 'persona' and 'role' can either be synonymous with each other or distinct from each other, depending on the embodiment. The potential differences between the terms are discussed in detail below. For certain implementations, however, 'personae' and 'roles' vary only semantically (e.g., they achieve substantially similar or even identical functionality).

As used herein, a persona generally refers to an identity that a user can assume as his or her individual identification (e.g., "JimAtHome" and "JimAtWork"). A persona typically implies individual expectations (e.g., traits attributable directly to the user), and separate personae tend to indicate separate domains. Certain implementations of the disclosed technology involve an information card that contains multiple personae (e.g., values that each identify a particular persona).

In contrast, a role generally refers to a title (e.g., "administrator" or "manager") that carries with it certain societal or group expectations. Also, a role typically has a common definition. For example, an "administrator" typically has well-defined responsibilities that are independent of whichever user assumes the role. Roles are often, but not necessarily, distinct from personae. For example, whereas only user Jim can truly assume "JimAtHome" and "JimAtWork," virtually any number of authorized users can potentially authenticate as an "administrator." Certain implementations of the disclosed technology can involve an information card that contains multiple roles (e.g., values that each identify a particular role).

In certain implementations of the disclosed technology, personae and roles can be handled separately. For example, an information card can contain roles in which the user may act. The user could thus select any number of roles (as opposed to a single persona) that are available to him or her during the card selection process (e.g., using a card selector). Each role selected by the user can invoke different claims and thus potentially trigger different claim values to be returned. Such embodiments can advantageously enable a user to ultimately provide a single set of authentication materials for a single information card.

In alternative implementations, personae and roles can be treated together. For example, if an information card contains multiple personae, a user can first select a certain persona and then select one or more roles that can be used with the selected persona. Consider an example in which a card selector presents the user Jim with two personae: "JimAtHome" and "JimAtWork." In the example, Jim selects "JimAtWork." The card selector can then present Jim with some or all of the roles that are associated with "JimAtWork," such as "manager," "database administrator," or "software developer," for example.

Figure 4:
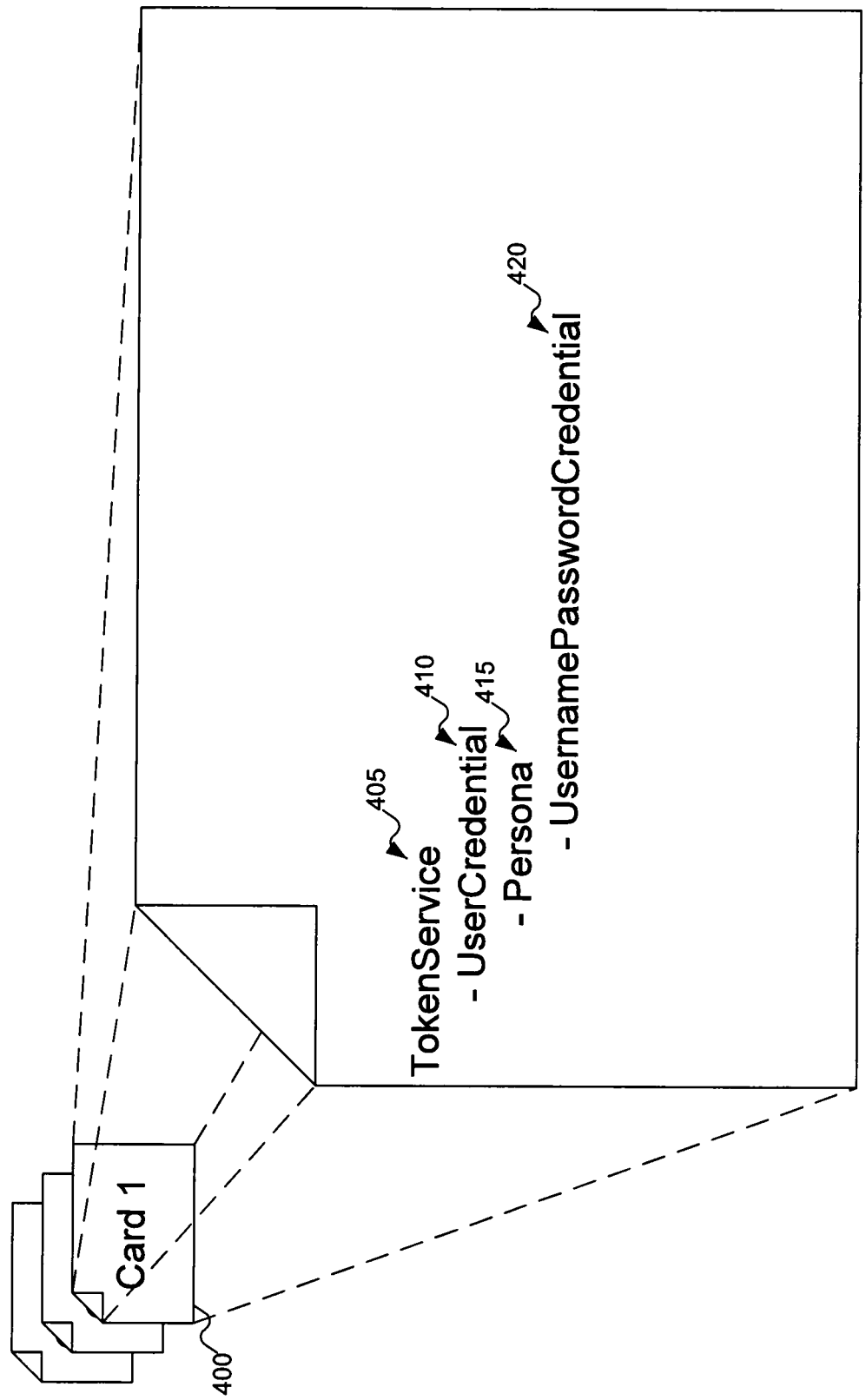
FIG. 4 illustrates an example of an information card in accordance with certain implementations of the disclosed technology.

Exemplary Multiple Persona Information Cards in Accordance with Implementations of the Disclosed Technology FIG. 4 illustrates an example of an information card 400 in accordance with certain implementations of the disclosed technology. The information card 400 has a TokenService element 405 that provides a list of security token service (STS) endpoints. The TokenService element 405 has a child element UserCredential 410 that includes an optional child element Persona 415. The Persona element 415 can be used to specify a particular user credential, for example. In certain embodiments, the user can select a particular persona and/or role(s) by specifying the persona/role(s) when selecting an information card (e.g., by using a card selector). In the example, the Persona element 415 can specify a username/password credential called UsernamePasswordCredential 420.

An exemplary schema for a token service element (such as the TokenService element 405 of FIG. 4, for example) is provided below:

```
<ic:TokenServiceList>
(<ic:TokenService>
  <wsa:EndpointReference> ... </wsa:EndpointReference>
  <ic:UserCredential>
    <ic:DisplayCredentialHint> xs:string </ic:DisplayCredentialHint> ?
    <ic:Persona Default="xs:boolean"> xs:string </ic:Persona> *
    (
      <ic:UsernamePasswordCredential>...
      </ic:UsernamePasswordCredential> |
      <ic:KerberosV5Credential>...</ic:KerberosV5Credential> |
      <ic:X509V3Credential>...</ic:X509V3Credential> |
      <ic:SelfIssuedCredential>...</ic:SelfIssuedCredential> | ...
    )
  </ic:UserCredential>
</ic:TokenService>) +
</ic:TokenServiceList>
```

The UserCredential element can provide one or more personae via the child element Persona. For example, the user can select a particular persona and/or role(s) when selecting a particular information card (e.g., using a card selector). In the example, the Persona element has an attribute Default that, when set to true, indicates that a particular persona and/or role(s) is designated as the default persona (e.g., a persona that can be used for user interface purposes and/or used in cases where the user does not select a particular persona).

In situations involving self-issued information cards, token services are typically not specified because self-issued cards generally contain the claim values themselves rather than being associated with a token service that supplies the claims. An example of a schema for a typical self-issued card is as follows:

```
<ic:InformationCardPrivateData> ?
    <ic:MasterKey> xs:base64Binary </ic:MasterKey>
    <ic:ClaimValueList> ?
        <ic:ClaimValue Uri="xs:anyURI" ...> +
            <ic:Value> xs:string </ic:Value>
        </ic:ClaimValue>
    </ic:ClaimValueList>
</ic:InformationCardPrivateData>
```

Certain implementations of the disclosed technology can include defining an element Persona that can appear in the ClaimValueList element. An example of a modified schema in accordance with the disclosed technology for self-issued information cards is provided below:

```
<ic:InformationCardPrivateData> ?
    <ic:MasterKey> xs:base64Binary </ic:MasterKey>
    <ic:ClaimValueList> *
        <ic:Persona Default="xs:boolean"> xs:string </ic:Persona>
        <ic:ClaimValue Uri="xs:anyURI" ...> +
            <ic:Value> xs:string </ic:Value>
        </ic:ClaimValue>
    </ic:ClaimValueList>
</ic:InformationCardPrivateData>
```

In the example, the Persona element can allow the ClaimValueList element to appear multiple times, where each ClaimValueList item represents the claim values for the corresponding persona/role(s) represented by the Persona element.

Exemplary Requests for Security Token (RSTs) in Accordance with Implementations of the Disclosed Technology When a user selects an information card, the card selector generally seeks to obtain a security token from an identity provider or security token service (STS) for the selected information card. The card selector typically obtains the security token in response to a Request for Security Token or RST (such as the request 155 of FIG. 1, for example) to the STS.

Figure 5:
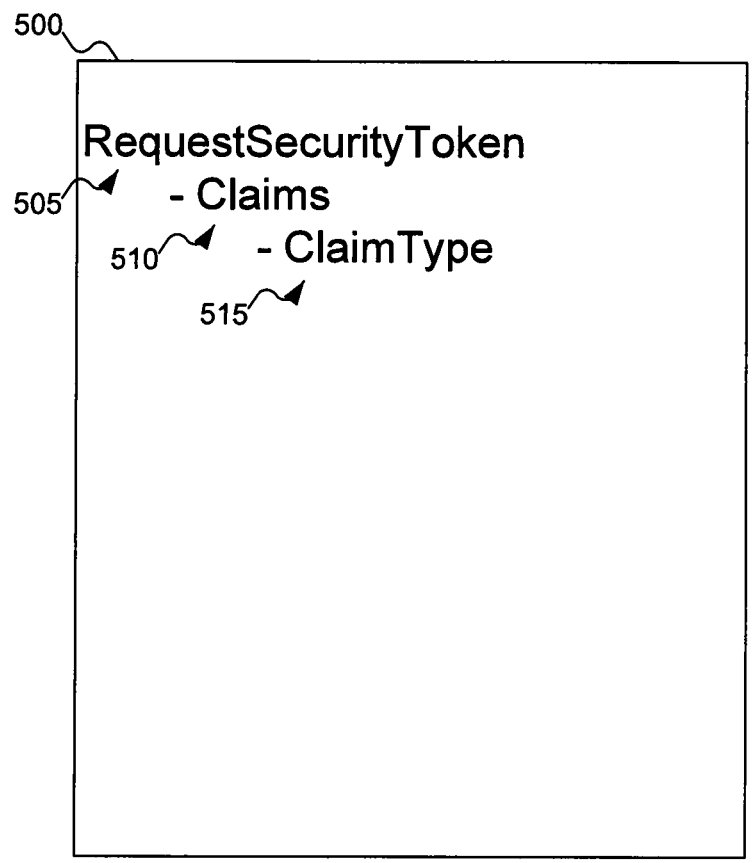
FIG. 5 illustrates an example of a Request for Security Token (RST) that includes a RequestSecurityToken element having a Claims element.

FIG. 5 illustrates an example of an RST 500 that includes a RequestSecurityToken element 505 having a child element claims 510. The Claims element 510 contains a set of ClaimType elements 515 that can be used to specify the types of claims to be constructed, for example.

Figure 6:
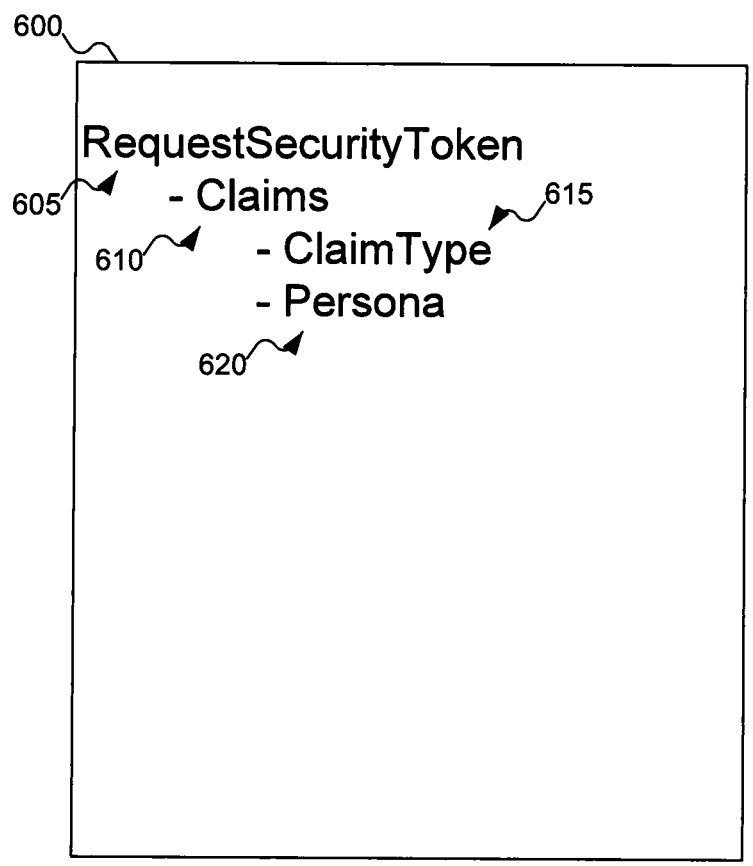
FIG. 6 illustrates an example of an RST in accordance with certain implementations of the disclosed technology.

FIG. 6 illustrates an example of an RST 600 in accordance with certain implementations of the disclosed technology. The RST 600 has a RequestSecurityToken element 605 that has a Claims element 610. The Claims element 610 contains a set of ClaimType elements 615. The Claims element 610 also has a Persona element 620. In the example, the Persona element 620 has as its value a string that identifies a particular persona (e.g., to be used in the construction of the claims).

In certain embodiments, each persona and/or role can be associated with a particular claim type (or claim value if the information card is a self-issued information card). Such arrangements advantageously enable the card selector to provide an improved indication of which claims are available on a per-persona/role basis.

Implementations of the disclosed technology advantageously require no changes to be made to existing formats for a Request for Security Token Response (RSTR).

Exemplary Card Selectors in Accordance with Implementations of the Disclosed Technology Implementations of the disclosed technology can include a card selector designed to advantageously allow a user to choose from a set of personae and/or roles (e.g., once the user has identified a particular information card to be used). In certain embodiments, virtually any information card selected by the user can have its own set of personae and/or roles. As such, the card selector can allow the user to first select an information card and then select a persona and/or one or more roles for the selected information card.

In embodiments involving managed cards (e.g., information cards managed by a security token service (STS)), the card selector can form a Request for Security Token (RST) using a Persona element, as described above. In embodiments involving self-issued cards, the card selector can use a Persona element within a ClaimValueList element, as described above, in order to identify the correct claim values to be used in construction of the security token.

In certain implementations of the disclosed technology, the card selector can query for any personae/roles that are available to the user before an information card is selected. For example, the card selector can perform the query in the background as the card selector starts up. The card selector can then present the user with a list of available information cards and pertinent personae/roles (e.g., personae/roles that satisfy a relying party's security policy). Alternatively, the card selector can prompt the user for a persona and/or role(s) and then present the user with some or all of the information cards associated with the selected persona and/or role(s).

In certain implementations, the card selector can present some or all applicable personae/roles to the user after the user has selected a particular information card. For example, once the user has selected a particular information card, the card selector can present some or all of the personae/roles associated with the information card selected. Alternatively, the card selector can determine which personae/roles to present based on which personae/roles were available during the user's previous transactions. The card selector can also present personae/roles based on whether they satisfy the relying party's security policy. In certain embodiments, the card selector can prompt the user to enter (e.g., type in) the desired persona and/or role(s).

In certain embodiments, the card selector can "blacklist" certain personae/roles (e.g., present all personae/roles other than certain personae/roles that are designated as not being available to the particular user). Alternatively, the card selector can "whitelist" certain personae/roles (e.g., only present certain personae/roles based on certain criteria such as an approval by a higher authority).

In alternative embodiments, the card selector can contact the STS to see which personae/roles are available to the user (e.g., which personae/roles the user is allowed to assume). The card selector can query the STS on a per-card basis (e.g., based on which personae/roles have valid claims associated therewith). Such information can also be delayed (e.g., until after the user presents the information card to the STS). For example, once the user authenticates to the STS, the STS can provide a list of the personae/roles available to the user.

Exemplary Identity Providers in Accordance with Implementations of the Disclosed Technology In certain embodiments, the identity provider or security token service (STS) is said to be persona-aware. That is, once the STS receives a Request for Security Token (RST) containing a Persona element, the STS can fulfill the request (e.g., in any of a number of different ways). For example, certain embodiments can include using the underlying data store of the STS to build an association between different personae and attributes or attribute values for the authenticating identity. The STS could then use the association matching the Persona value in the RST to build the appropriate claims.

Alternative embodiments can include the use of a particular identity for authentication purposes and the use of different but related identities (e.g., identified by persona/role) that each have different attribute values from which claims for the corresponding persona can be constructed.

Certain implementations can involve an association that maps a given persona to particular attributes of the corresponding identity (e.g., to enable an STS to build the correct claims for the given persona). In certain embodiments, the STS can allow a user to create an identity and then associate different attribute values with the identity based on persona. For example, a user can designate multiple personae for his or her personal identity (e.g., using an "at work" persona and an "at home" persona, as discussed above). The STS can then associate appropriate attribute values for each persona. For example, the STS could note that the user's "at home" telephone number is 800-555-1212.

Figure 7:
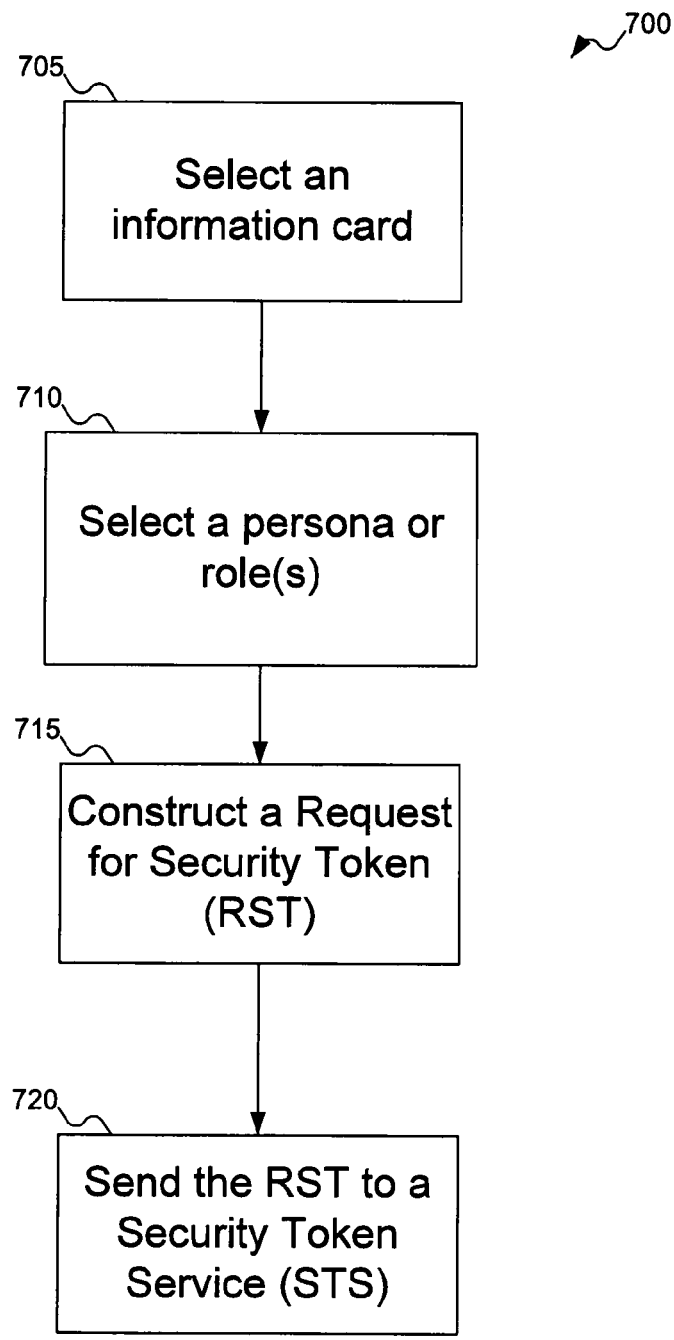
FIG. 7 illustrates a first example of a method of using multiple persona information cards in accordance with certain implementations of the disclosed technology.

Exemplary Methods in Accordance with Implementations of the Disclosed Technology FIG. 7 illustrates a first example of a method 700 of using multiple persona information cards in accordance with certain implementations of the disclosed technology.

At 705, an information card is selected (e.g., by a user). For example, a card selector can present a user with some or all of the information cards that are available to him or her. The user can then select a desired one of the information cards presented. Alternatively, the card selector can automatically select an information card for the user (e.g., based on past selections).

At 710, a persona or role is selected. In certain embodiments, the user can select a particular persona or role based on the selected information card. For example, based on the selected information card, the card selector can present the user with a list of some or all of the personae and/or roles available for use with the selected information card. The user can then select a desired persona and/or one or more role. Alternatively, the card selector can automatically select a persona and/or role(s) for the information card (e.g., based on past selections).

In certain embodiments, either a persona or one or more roles can be selected, as discussed above. In other embodiments, a persona can be selected first and then one or more roles (e.g., associated with the persona) can be selected. In alternative embodiments, one or more roles can be selected first and then an associated persona can be selected.

At 715, a Request for Security Token (RST) can be constructed based on the claim values associated with the selected persona and/or role(s).

At 720, the RST can be sent to the Security Token Service (STS). Upon receiving the RST, and based on the selected persona/role(s) (e.g., as indicated by corresponding specifiers), the STS can generate a security token (e.g., by building appropriate claims for the persona/role(s)) and return it to the card selector (e.g., using a Request for Security Token Response (RSTR)).

Figure 8:
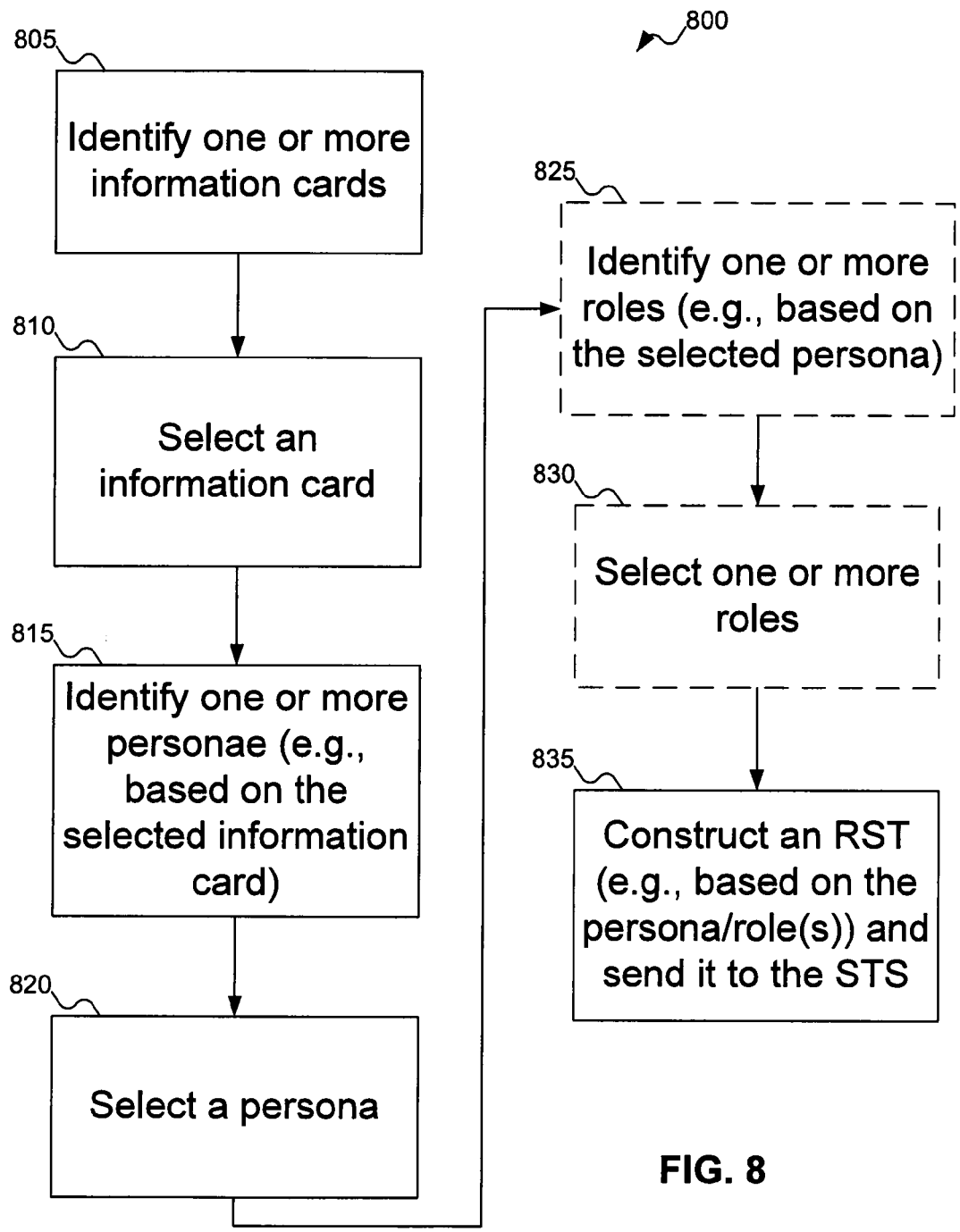
FIG. 8 illustrates a second example of a method of using multiple persona information cards in accordance with certain implementations of the disclosed technology.

FIG. 8 illustrates a second example of a method 800 of using multiple persona information cards in accordance with certain implementations of the disclosed technology.

At 805, one or more information cards are identified (e.g., by a card selector). The card selector can present a listing of the information card(s) to a user. For example, the card selector can present all of the user's information cards or only information cards that satisfy the relying party's security policy.

At 810, the user selects an information card from the listing. In certain embodiments, the card selector can suggest a particular information card to the user (e.g., based on previous information card selections for use with the same relying party).

At 815, one or more personae are identified (e.g., by the card selector). The card selector can present a listing of the identified persona or personae to the user. The listing can be based on the selected information card. For example, the card selector can present only personae that are associated with the selected information card. Alternatively, the card selector can present all of the user's personae to the user, regardless of whether they are associated with the selected information card.

At 820, a persona is selected. For example, the user can select the persona (e.g., from the listing presented at 810). Alternatively, the card selector can automatically select a persona or suggest a particular persona to the user (e.g., based on previous persona selections for use with the same relying party).

At 825, which is an optional step in the example, one or more roles can be identified (e.g., by the card selector). The card selector can present a listing of the role(s) to the user. The listing can be based on the selected persona. For example, the card selector can present only roles that are associated with the selected persona. The card selector can also limit the listing of roles to those roles (or combinations of roles) that satisfy the relying party's security policy. Alternatively, the card selector can present all of the user's roles to the user, regardless of whether they are associated with the selected persona.

At 830, which is also an optional step in the example, one or more roles are selected. For example, the user can select the role(s) (e.g., from the listing presented at 825). Alternatively, the card selector can automatically select one or more roles or suggest one or more roles to the user (e.g., based on previous role selections for use with the same relying party). In certain embodiments, no roles are selected (e.g., if the user does not want to specify any particular roles). In these embodiments, a default role can be used (if such a default role exists).

At 835, an RST is constructed (e.g., based on the selected persona and/or role(s)) and sent to the STS. Upon receipt of the RST, and based on the selected persona/role(s), the STS can generate a security token (e.g., based on claim values corresponding to the selected persona and/or role(s)) and return it to the card selector (e.g., using an RSTR).

One having ordinary skill in the art will appreciate that the methods illustrated in FIGS. 7 and 8 are not meant to be limiting in any way and that there are many different variations of the illustrated methods that can be implemented in accordance with the disclosed technology.

For example, as discussed above, the card selector can present certain personae and/or role(s) to the user before presenting any information cards (e.g., so that the user can first select a persona and/or role(s) and then be presented with a listing of applicable information cards by the card selector). In other embodiments, the user can simply specify a persona and/or role(s) to the card selector and the card selector can automatically suggest or even select an information card based on the user's selection of persona/role(s).

Exemplary User Scenario in Accordance with Implementations of the Disclosed Technology An example of a user scenario in accordance with the disclosed technology involves a hospital employee having multiple personae/roles. For example, the user can act as either the hospital administrator or as a surgeon. During the course of his or her duties, the hospital employee needs to use a card selector (e.g., in order to present a security token to each of various relying parties).

Unlike today's information card systems in which the employee would undesirably need two separate information cards (i.e., a first card representing him as the hospital administrator and a second card representing him as surgeon), implementations of the disclosed technology can advantageously allow the employee to authenticate as either the administrator or as a surgeon using a single information card.

For example, the employee can have a single information card that contains a Persona element with two different values: one corresponding to the employee as the administrator and another corresponding to the employee as a surgeon. Depending on which persona the user (or card selector) selects, the resulting claim values used in generating the security token would correspond to the selected persona. One having ordinary skill in the art will appreciate that, in the example, some of the claim values may be the same, regardless of which persona is selected.

In the example, each of the two personae can have different roles associated therewith. For example, whereas the persona corresponding to the hospital administrator can have management-oriented roles associated with it (e.g., roles that are not associated with the surgeon persona), the persona corresponding to a surgeon can have medical oriented roles associated with it (e.g., roles that are not associated with the hospital administrator persona). Thus, once a persona is selected (e.g., by the user or by the card selector), one or more roles associated with the selected persona can be selected and the resulting claims used in generating the security token would correspond to the combination of the selected persona/role(s).

General Description of a Suitable Machine in Which Embodiments of the Disclosed Technology Can Be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention.

What is claimed as the invention, therefore, is all such modifications as may come within the scope and spirit of the following claims and equivalents thereto.

The invention claimed is:

1. A computer-implemented method for a user having multiple personae, each persona referring to a digital identity that the user can assume as an individual identification, the method comprising:
   a computer identifying at least one information card, each information card representing multiple digital identities of the user and having a token service element that has a user credential element, the user credential element including a persona element for specifying a particular credential for a corresponding persona;
   the computer selecting one of the identified at least one information card;
   the computer identifying at least one persona associated with the selected one of the identified at least one information card;
   the computer selecting one of the identified at least one persona; and
   the computer generating a Request for Security Token (RST) having a claims element that includes a set of claim type elements that specify which types of claims are to be constructed and further includes a persona element that identifies which persona is to be used in construction of the claims, wherein the RST is based at least in part on the selected one of the identified at least one information card and the selected one of the identified at least one persona.

2. The computer-implemented method of claim 1, further comprising the computer displaying the identified at least one persona.

3. The computer-implemented method of claim 1, further comprising the computer transmitting the generated RST to a Security Token Service (STS).

4. The computer-implemented method of claim 1, wherein identifying the at least one persona is performed by a card selector.

5. The computer-implemented method of claim 1, further comprising the computer identifying at least one role associated with the selected one of the identified at least one persona.

6. The computer-implemented method of claim 5, further comprising the computer selecting at least one of the identified at least one role.

7. The computer-implemented method of claim 5, wherein identifying the at least one persona and identifying the at least one role are performed by a card selector.

8. The computer-implemented method of claim 1, wherein identifying the at least one persona comprises identifying at least one persona that satisfies a security policy of a relying party.

9. One or more tangible, computer-readable media storing computer-executable instructions that, when executed by a processor, perform the computer-implemented method of claim 1.

10. A computer-implemented method for a user having multiple personae, each persona referring to a digital identity that the user can assume as an individual identification, the method comprising:
    a computer identifying at least one persona;
    the computer selecting one of the at least one identified persona;
    the computer identifying at least one information card associated with the selected one of the at least one identified persona each information card representing multiple digital identities of the user and having a token service element that has a user credential element, the user credential element including a persona element for specifying a particular credential for a corresponding persona;
    the computer selecting one of the at least one identified information card; and
    the computer generating a Request for Security Token (RST) having a claims element that includes a set of claim type elements that specify which types of claims are to be constructed and further includes a persona element that identifies which persona is to be used in construction of the claims, wherein the RST is based at least in part on the selected one of the at least one identified persona and the selected one of the at least one identified information card.

11. The computer-implemented method of claim 10, further comprising the computer transmitting the generated RST to a Security Token Service (STS).

12. The computer-implemented method of claim 10, wherein identifying the at least one information card is performed by a card selector.

13. The computer-implemented method of claim 10, further comprising the computer displaying the at least one identified persona.

14. The computer-implemented method of claim 10, further comprising:
    the computer identifying at least one role associated with the selected one of the at least one identified persona; and
    the computer selecting one of the at least one identified role.

15. The computer-implemented method of claim 10, wherein identifying the at least one persona is responsive to selecting at least one of a plurality of roles, wherein each of the at least one identified persona is associated with at least one of the selected at least one of the plurality of roles.

16. One or more tangible, computer-readable media storing computer-executable instructions that, when executed by a processor, perform the computer-implemented method of claim 10.

17. A machine configured to:
    identify and display a plurality of information cards, each information card representing multiple digital identities of a user and having a token service element that has a user credential element, the user credential element including a persona element for specifying a particular credential for a corresponding persona; and
    identify and display a plurality of personae, wherein each of the plurality of personae is associated with at least one of the plurality of information cards.

18. The machine of claim 17, further configured to identify and display a plurality of roles, wherein each of the plurality of roles is associated with at least one of at least one of the plurality of personae and at least one of the plurality of information cards.

19. The machine of claim 17, further configured to generate a security token request based on a selected one of the plurality of information cards and a selected one of the plurality of personae, the security token request having a claims element that includes a set of claim type elements that specify which types of claims are to be constructed and further includes a persona element that identifies which persona is to be used in construction of the claims.

20. A tangible computer-readable medium storing instructions that, when executed by a processor, cause the processor to perform a method comprising:
    identifying a plurality of information cards;
    displaying at least some of the plurality of identified information cards;
    responsive to a selection of one of the plurality of identified information cards, identifying a plurality of personae associated with the selected information card;
    displaying the plurality of personae;
    responsive to a selection of one of the plurality of personae, identifying a plurality of roles associated with the selected persona; and
    responsive to a selection of at least one of the plurality of roles, generating and transmitting a Request for Security Token (RST), wherein the RST is based at least in part on the selected information card, the selected persona, and the selected at least one role.

* * * * *